Aug. 5, 1924.

R. W. HAMILTON

FARE REGISTER MECHANISM

Filed May 15, 1922

1,503,754

INVENTOR
R. W. Hamilton
BY
ATTORNEY

Patented Aug. 5, 1924.

1,503,754

UNITED STATES PATENT OFFICE.

ROBERT W. HAMILTON, OF NEW YORK, N. Y.

FARE-REGISTER MECHANISM.

Application filed May 15, 1922. Serial No. 560,877.

*To all whom it may concern:*

Be it known that I, ROBERT W. HAMILTON, a citizen of the United States, and a resident of the city of New York, in the county and State of New York, have invented certain new and useful Improvements in Fare-Register Mechanism, of which the following is a full, clear, and exact description.

Among the principal objects which the present invention has in view are: to register the distance travelled by a vehicle under load-carrying conditions; to indicate the earning mileage travelled by a public vehicle; to adapt the registering mechanism to the traffic conditions under which public vehicles operate; to prevent tampering with the mechanism; and to simplify and cheapen the construction of said mechanism.

*Drawings.*

*Description.*

The present mechanism as shown in the accompanying drawings is particularly designed to detect and to prevent pilfering or mis-appropriation of moneys received as earnings of a public passenger vehicle. With this object in view an odometer 7 of usual construction is mounted in a container case having flanges 8.

Figure 1:
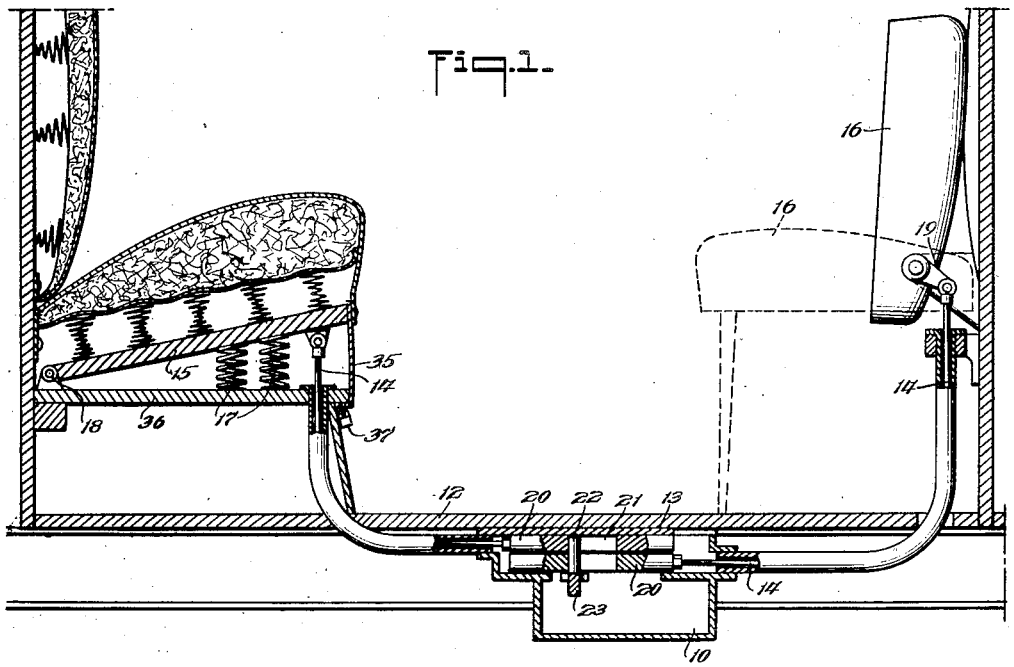
Figure 1 is a vertical section of a portion of a public vehicle showing the arrangement and construction of a mechanism of the character mentioned when applied thereto.

The flanges 8 are engaged to slide in grooves formed in brackets 9 forming part of a housing box 10. The box 10 is mounted by means of perforated lugs 11 on the floor structure of an automobile or similar vehicle. The box 10 as shown best in Fig. 1 of the drawings is preferably suspended from beneath the floor boards 12 of the vehicle.

The box 10 is provided with a cover 13 to prevent tampering with the mechanism contained therein. A glass insert is placed in the cover 13 so that the mounting members of the odometer 7 may be viewed by removing a section of the floor boarding 12, or other covering, if the same is provided. The location in the car structure of the box 10 and the mechanism contained therein is optional with the owner or builder of the vehicle. The mechanism contained therein is connected by Bowdoin cables 14 with the seat structures 15 and 16. The structures 15 are preferably supported in raised position by springs 17 and are hinged at 18 to the body of the vehicle. For the auxiliary seats indicated by the numeral 16, a crank 19 is provided, the moving end of which is attached to the Bowdoin cable 14. The cable 14 is protected in the usual manner.

The ends of the cables 14 are connected, each to one of the slotted guide blocks 20. The blocks 20 have each an engaging slot 21 through which protrudes an engaging pin 22 of a bell crank 23.

The bell crank 23 is pivoted on a shaft 24 so that the free end 25 of the crank engages the end of a plunger 26 with which the container for the odometer 7 is structurally connected. The plunger 26 is normally held by an expansion spring 27 in a position where the container for the odometer 7 is retracted so that the bracket 29 is removed from the path of the bracket 30, which is operatively connected with a flexible shaft 31 to be driven thereby.

Figure 2:
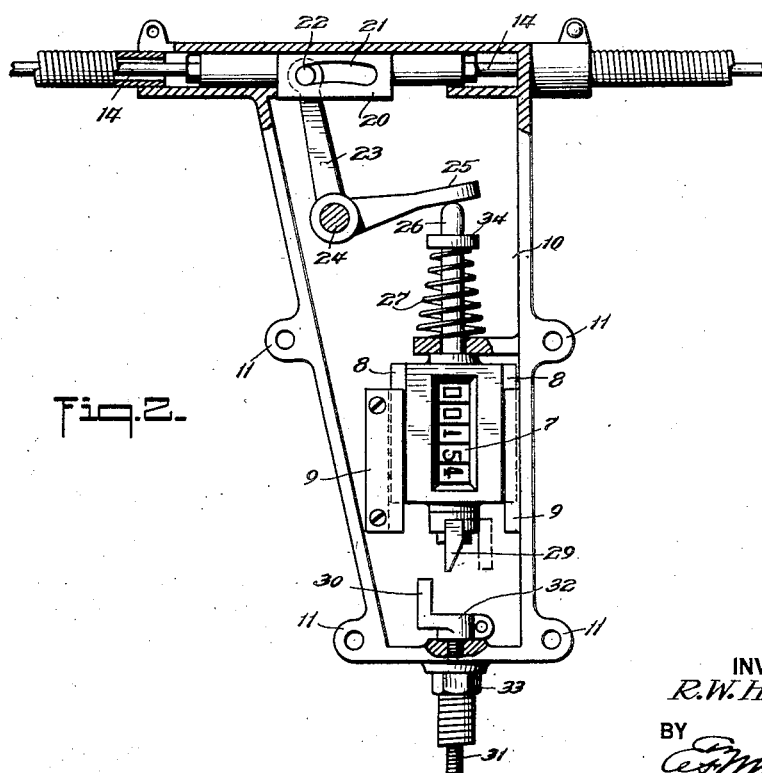
Figure 2 is a top plan view of a portion of the mechanism showing fragments of operating connections therewith.

As shown best in Fig. 2 of the drawings the bracket 30 is mounted on a rotary member 32 held inside of the box 10 and on a seat provided therein by the nut 33.

The brackets 29 and 30 are drawn to a knife's edge at the end of said brackets to avoid striking whenever the odometer 7 is moved by the bell crank 23, into the path of the bracket 30. The bracket 29 is operatively connected with the odometer 7, which is therefore caused to function whenever the bracket 29 engages the constantly rotated bracket 30.

It will be understood that the end of the shaft 31 within the box 10 and the shaft on which the bracket 29 and the elements of the odometer 7 are mounted are co-axial so that when the brackets 29 and 30 are engaged they travel a concentric path.

From the foregoing it is obvious that when a taxi-cab or vehicle of similar character is provided with a mechanism such as shown in the drawings and herein described, the operation would be as follows: When a passenger enters the cab and becomes seated either on the structure 15 or 16, one or both of the cables 14 are operated to rotate the bell crank 23 so that the free end 25 thereof moves the plunger 26 and odometer connected therewith, forward to present the bracket 29 in the path of the bracket 30. The flexible shaft 31 is connected with what is known as the speedometer mechanism with which most vehicles of the character mentioned are provided. If such mechanism is not available, other mechanism will be used for connecting the shaft 31 with one of the carrying wheels of the vehicle so that the distance travelled by the wheel is registered by the odometer 7.

From this time, it will be understood, and as long as the passenger remains seated on the seat structures the distance travelled by the vehicle will be registered by the odometer 7.

When, now, the passenger alights from the vehicle, or rises from the seat structures 15 and 16, the springs 17 and those employed to return the structure 16 to its upright, or inactive position, will retract the cables 14 and the blocks 20 connected therewith. This permits the spring 27 to press upon the collar 34 and move the plunger 26 and odometer 7 connected therewith until the bracket 29 is withdrawn from the path of the bracket 30. Thereafter the shaft 31 and bracket 30 connected therewith may be operated without affecting the odometer 7.

When operated as above described, it is obvious that the mileage of the vehicle while carrying a passenger is registered independently from the mileage of travel by the vehicle, thus compelling the driver to make an accurate return of the earnings of the vehicle.

Any suitable means for sealing or protecting the mechanism and parts thereof, herein described to prevent the operation, may be employed. As shown in the drawings the cover 35 of the seat 15 is carried below the box 36 and is secured there by a lock 37 of any suitable construction. The lock 37 permits the free end of the cover 35 to be raised for the inspection of the springs 17 and the Bowdoin cable 14 where it is connected with the structure 15.

*Claims.*

1. In a vehicle, a casing, a bracket in said casing, a register slidably mounted in said bracket, an actuator for said register extending into said casing, continuously operating connection between said actuator and a wheel of the vehicle, spring means in said casing for holding said register normally free of said actuator, a lever journalled in the casing for moving said register into connection with the actuator, and connection between said lever and a seat of the vehicle for moving said lever when weight is applied on the seat.

2. In a vehicle, a casing, a bracket therein a register supported in said bracket and movable therein, an actuator for said register extending into said casing at one end, connection between said actuator and a wheel of the vehicle for continuous operation of said actuator, said register being disposed in the casing in normally spaced relation from the actuator, means for maintaining said register in such spaced relation, register moving means mounted in the casing, and connection between said means and a seat of the vehicle for causing said means to move said register into engagement with said actuator on application of weight on said seat.

3. In a vehicle, an elongated casing, a lateral bracket on a wall of said casing, guide members disposed in said casing, a register slidably disposed between said guide members, a stem carried by said register and extending through said bracket, an actuator for said register extending into said casing, a continuously operating connection between said actuator and a wheel of the vehicle, a stop on said stem, a spring surrounding said stem and disposed between said bracket and stop for maintaining said register in normal spaced relation from said actuator, a bell crank lever journaled in said casing with one arm thereof engaging the end of said stem, and a connection between the other arm of said lever and the vehicle seat for rocking said cover to move said register into engagement with said actuator on depression of said seat.

ROBERT W. HAMILTON.